Figure 1:
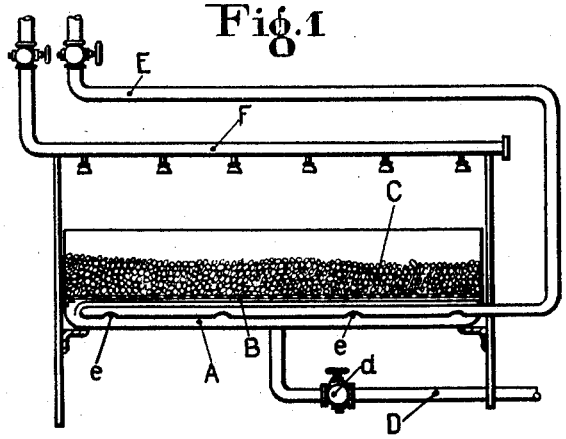

Dec. 15, 1931.  E. RABINOWITSCH  1,836,937
PROCESS FOR FERMENTATION AND DISINTEGRATION
OF THE CELLULAR TISSUE OF GRAINS
Filed June 7, 1929

EFRAIM RABINOWITSCH
Inventor
By
Attorney

Patented Dec. 15, 1931

1,836,937

UNITED STATES PATENT OFFICE

EFRAIM RABINOWITSCH, OF HAIFA, PALESTINE, ASSIGNOR TO SANFARINE SOCIÉTÉ ANONYME DE NOUVEAUX PROCÉDÉS, RATIONNELS DE PURIFICATION ET DE PRÉPARATION DE PATES DE CÉRÉALES, OF PARIS, FRANCE, A JOINT-STOCK COMPANY OF FRANCE

PROCESS FOR FERMENTATION AND DISINTEGRATION OF THE CELLULAR TISSUE OF GRAINS

Application filed June 7, 1929, Serial No. 369,245, and in Great Britain June 8, 1928.

The methods of wet milling of grain and direct preparation of dough from dry grain or from any germinated grain are not new; they have one and all, however, so far, given negative results, since the proteins in the peripheral layers of the grain could only be partly utilized by the organism and the whole cellulose and cellular tissue in the prepared bread are altogether indigestible.

The process according to the invention differs from the process hitherto known in that:

1. The aleurone cells are completely disintegrated and the valuable phosphates and proteins thereby made fit for human digestion.

2. The cellulose of the husk and all the cellular tissues are separated, disintegrated and so changed through partial dextrination that they do not separately become apparent in mastication of the prepared bread, but are rendered easily digestible and in no way disagree with the processes of digestion.

3. The starch in the grain has a greater and more constant readiness to swell, so that bread baked from fermented whole grain dough does not get stale.

4. The spores of fungus mould are killed, so that the bread does not get mouldy and can be kept for long periods.

These special properties are obtained by making use of the activity of the rich fermenting ingredients of the germinated grain.

The process is as follows:—

The dry cleaned grain which is to be prepared is thoroughly washed for half to three-quarters of an hour, in an 8 per cent. solution of $H_2SO_4$. The grain is thereby disinfected and the cellulose of the husks made ready for future dextrination.

The grain is then placed in the apparatus for activating germination, and washed for three-quarters of an hour in running water in order to remove all traces of the sulphuric acid solution and then is allowed to swell for about 24 hours.

As soon as the swelling is completed, which is ascertained in the same manner as in malt production, the grain is exposed to a continuous current of water and air.

Germination now begins and lasts for about 24-26 hours. During germination the activity of the rich fermenting ingredients increases and the soluble diastases are formed.

Practice has shown that the rotary drums used for malt production are unsuitable and the best results are obtained by the above-mentioned method, because the grain, whilst stationary, is simultaneously exposed to a continuous current of air and the flow of water.

If no definite taste of gluten is noticed in masticating the germinated grain, the latter is ready for further preparation.

After the addition of about 2.5 per cent. NaCl, 0.5 per cent glycerin and 3 per cent. lime water (in the proportion of 1:10), the swollen grain is passed to the kneading machine, where it is worked into a coarse dough.

The fermentation autoclave and cellular tissue disintegrating machine is half filled with this dough and is then hermetically sealed with a piston, the initial pressure being atmospheric. It is then left to ferment and disintegrate the cellular tissue at a temperature of from 30°–35° C. During the fermentation, which takes some 12–14 hours, the pressure rises to 3.5 atmospheres. By the formation of a vacuum the effective pressure rises to 4.5 atmospheres.

When fermentation ceases, i. e. when the pressure no longer increases, the pressure is suddenly released.

The above process is characterized by the sudden release of the pressure created by fermentation, which causes the cellular tissue to burst. The aleurone cells are completely disintegrated, all the layers are disintegrated and burst; in consequence of this fermentation the cellulose is dextrinated, the starch is more readily and constantly swollen and the germs of fungous mould are killed.

The fermented dough is then forced out of the autoclave and passed to the second kneading machine where yeast is added; it is kneaded mechanically and is now ready for baking into whole grain bread.

This particular fermentation and germination process is a method for fully utilizing all the phosphates and proteins of the grain husks and thereby making use of the whole grain, without previous milling, for bread baking.

This process of fermentation and disintegration is suitable for all kinds of cereals.

The accompanying drawings illustrate apparatus for carrying out the process according to the invention.

Fig. 1 represents the swelling and germinating apparatus, where the grain, without being moved, is continuously moistened and aerated. The apparatus consists of a tank A over the bottom of which there is a screen B. The grain C to be germinated is placed on the container above the screen and is exposed to a stream of water from a pipe system F. The grain is continuously moistened, and by opening the air exhaust at the end of the pipe system E, the air is withdrawn. The air valves e are protected by a hood G which prevents the water from penetrating into the air pipes system. A pipe D and cock d are provided for draining off the water from the tank A.

Figure 2:
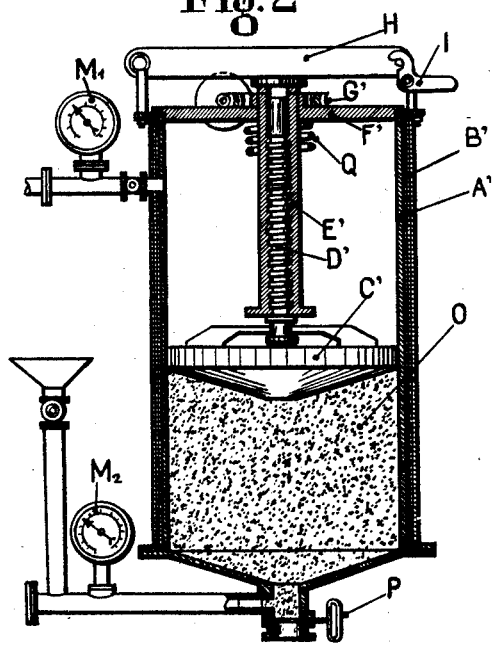

Fig 2 shows the fermentation and cellular tissue disintegrating apparatus. This consists of a cylinder H with an insulating lining. The cylinder H is half filled with dough K, the lid L closed and the piston M pushed down by a worm gearing N, hermetically sealing the cylinder H. The screw threaded eve nut O is supported by a hinged bar P, which is held in place by a catch Q. As soon as the fermentation process is completed, the bar P is freed by releasing the catch Q, whereupon the piston M, by the sudden release of the pressure, springs upwards and the shock is absorbed by a spring R. The fermented dough is forced out by lowering the piston. T is a manometer indicating the vacuum. U is a manometer indicating the pressure.

What I claim is:

1. A process of the class described comprising the steps of fermenting grain in a closed receptacle until a predetermined pressure is built up in the latter, then rapidly releasing the pressure in said receptacle whereby certain portion of the grain may be broken up due to the sudden release of pressure.

2. A process of class described comprising the steps of permitting grain to germinate, working the germinated grain into a coarse dough, fermenting the coarse dough in a closed vessel until a predetermined pressure is built up in the latter, and rapidly releasing the pressure in the vessel, whereby certain elements in the grain may be broken up.

3. A process as defined in claim 2 in combination with the steps of adding yeast and baking the dough thus obtained to obtain bread.

4. A process of the class described comprising the steps of disinfecting grain, permitting the latter to germinate, adding a mixture of glycerine, lime water and salt, kneading to produce a coarse dough, permitting the latter to ferment in a closed vessel until a predetermined temperature has been built up in the latter, rapidly releasing the pressure in the vessel so as to break up certain elements in the grain, and making bread from the product thus obtained.

In testimony whereof I have affixed my signature.

EFRAIM RABINOWITSCH.

CERTIFICATE OF CORRECTION.

Patent No. 1,836,937.  Granted December 15, 1931, to

EFRAIM RABINOWITSCH.

It is hereby certified that the name of the assignee in the above numbered patent was erroneously described and specified as "Sanfarine Societe Anonyme de Nouveaux Procedes, Rationnels de Purification et de Preparation de Pates de Cereales", whereas said name should have been described and specified as Sanfarine Societe Anonyme de Nouveaux Procedes, Rationnels de Panification et de Preparation de Pates de Cereales, as shown by the records of assignments in this office; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.